Feb. 23, 1926. 1,574,107
A. W. PETERS
METHOD OF AND APPARATUS FOR MIXING AND PROPORTIONING GASES
Filed Dec. 7, 1921 2 Sheets-Sheet 1

INVENTOR.
Arthur W. Peters
BY
Arthur L. Kent
his ATTORNEY.

Feb. 23, 1926. 1,574,107
A. W. PETERS
METHOD OF AND APPARATUS FOR MIXING AND PROPORTIONING GASES
Filed Dec. 7, 1921 2 Sheets-Sheet 2
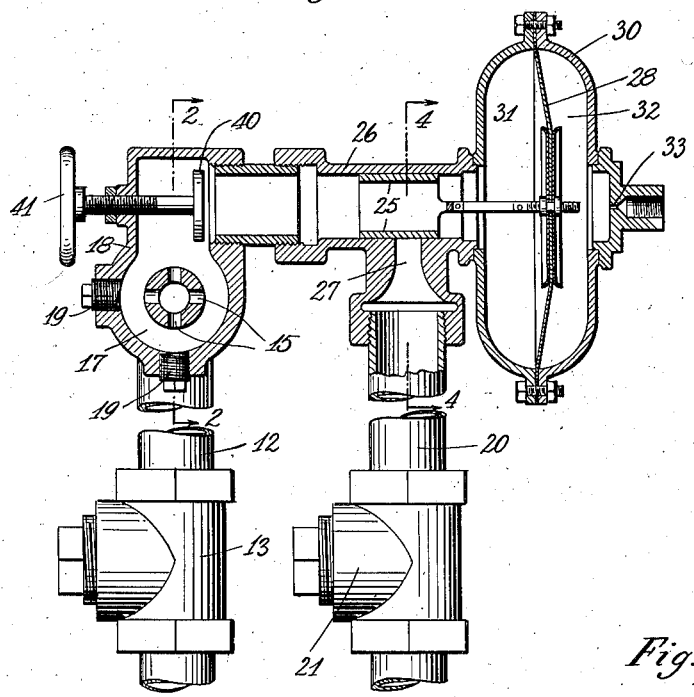
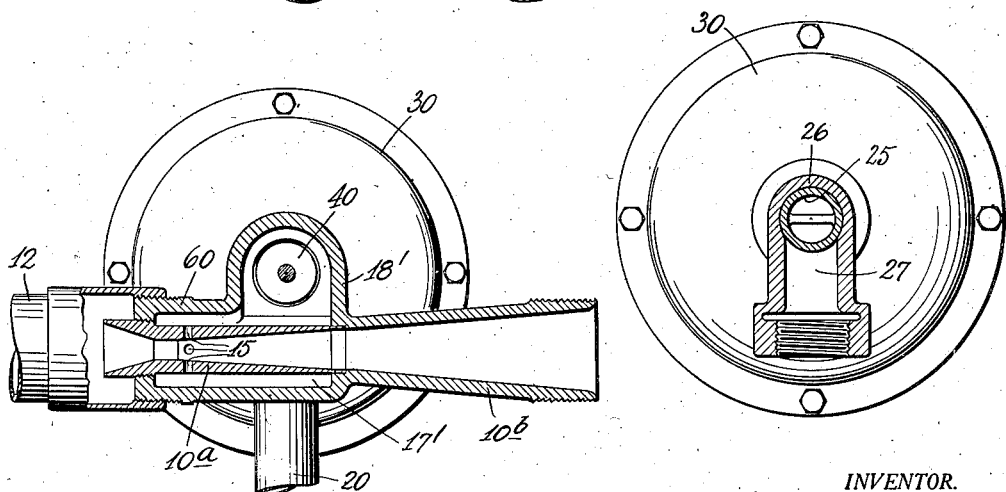
INVENTOR.
Arthur W. Peters
BY Arthur L. Kent
his ATTORNEY.

Patented Feb. 23, 1926.

1,574,107

UNITED STATES PATENT OFFICE.

ARTHUR W. PETERS, OF NEW YORK, N. Y., ASSIGNOR TO THE SURFACE COMBUSTION CO., INCORPORATED, OF NEW YORK, N. Y., A CORPORATION OF NEW YORK.

METHOD OF AND APPARATUS FOR MIXING AND PROPORTIONING GASES.

Application filed December 7, 1921. Serial No. 520,490.

*To all whom it may concern:*

Be it known that I, ARTHUR W. PETERS, a citizen of the United States, residing at New York city, in the county of Bronx and State of New York, have invented certain new and useful Improvements in Methods of and Apparatus for Mixing and Proportioning Gases, fully described and represented in the following specification and the accompanying drawings, forming a part of the same.

This invention relates to a method and apparatus for mixing and proportioning gases, and more especially to a method and apparatus for producing and supplying an explosive mixture of fuel gas and air for combustion. The invention has been made especially with the idea of providing an improved method and apparatus for supplying an explosive mixture of fuel gas and air to the burner discharge orifices of a surface combustion furnace at a pressure above a predetermined minimum and in quantities variable at will without changing the proportions of the constituent gases, that is, to meet the conditions of constant proportions, variable quantity, and exit pressure sufficient to prevent backflashing.

The invention comprises a method wherein the air, or gas which enters into the mixture in the largest volume, is supplied at a relatively high pressure to serve as the driving gas and has some of its pressure energy changed to velocity energy with reduction of pressure and is caused to flow from a passage of relatively small cross-section into and through a passage of increasing cross-section wherein velocity of the air is changed back into pressure energy, and the fuel gas, or gas which enters the mixture in smaller relative quantity, supplied at a relatively low pressure, is admitted to the stream of air at a point of relatively high velocity and low pressure slightly beyond the place of minimum cross-section of the flow way; and the invention also comprises apparatus for carrying out the method, all as hereinafter more fully described and as claimed. Most desirably the flow of the air is through a passageway comprising an entrance cone, or part of decreasing cross-section, and a part of minimum cross-section, or throat, and a part of increasing cross-section, or pressure building cone, associated together to form a Venturi tube, and the gas is admitted to such Venturi tube through an inlet opening or openings located slightly beyond the place of minimum cross-section of the tube, the proportions of fuel gas and air in the resulting mixture being controlled by an adjustable restriction past which the fuel gas flows to the inlet opening or openings from a source of supply at constant pressure.

Venturi inspirating apparatus heretofore used for supplying an explosive mixture of fuel gas and air for combustion in which the air supplied under a suitable pressure serves as a driving or inducing gas to draw in fuel gas through a nozzle located to discharge into the entrance cone of the Venturi tube in the direction of flow through the tube, is very sensitive, requiring for the maintenance of constant proportions of fuel gas and air in the mixture under operating conditions a very exact construction and relative proportioning of parts of the apparatus, and especially of the size ratio between the cross-area of the Venturi throat and the cross-area of the gas inlet orifice. The present invention provides a method and apparatus whereby the desired maintenance of proportions in the mixture, together with a high efficiency in entraining the desired amount of gas with a maximum delivery pressure of the mixture, may be secured with the use of Venturi tube apparatus which does not require such close proportioning of the relative sizes of the minimum cross-section passage, or Venturi throat, and the gas inlet opening or openings, or of the throat and burner orifice area, and which permits of a given apparatus being used for fuel gas of widely varying heat value, that is, for producing explosive mixtures having wide variation of fuel gas and air ratio, and for supplying explosive mixture to a burner orifice or orifices of aggregate cross-area varying within a considerable range.

In an apparatus embodying apparatus features of the invention and for carrying out the method the fuel gas inlet opening or openings, which are most desirably located in the wall of the Venturi tube just beyond the place of minimum cross-section, need not bear any exact ratio to the throat area, it being necessary only that such inlet openings shall be of sufficiently large size. The amount of fuel gas entering to join the air stream in the Venturi tube is then accurately proportioned by adjustment of a flow controlling restriction past which the fuel gas flows to the inlet openings. It is, of course, necessary that the fuel gas be supplied under a suitable constant pressure, which should be approximately equal to the internal furnace pressure, or pressure against which the mixture is discharged. It is also necessary, of course, for the maintenance of proportionality in the mixture under variations in quantity of mixture produced that the passage between the Venturi tube and the burner discharge orifice or orifices shall be sufficiently large to prevent interference with the maintenance of proportionality by dead flow, or pipe, resistance.

Apparatus of the present invention is relatively inexpensive because of its relatively simple construction, small number of parts and light weight; also because of the absence of any necessity of exact relation between the Venturi throat area and gas inlet orifices, and also the greater permissible latitude of ratio of throat area to burner orifice area.

The accompanying drawings illustrate an approved form of apparatus for supplying an explosive mixture of fuel gas and air embodying the apparatus features of the invention and for carrying out the method, and a modification thereof. In said drawings:—

Fig. 3 is a sectional view taken on line 3—3 of Fig. 2;

Fig. 4 is a view taken on line 4—4 of Fig. 3; and

Fig. 5 is a view similar to Fig. 2 but showing a slightly modified construction.

Figure 1:
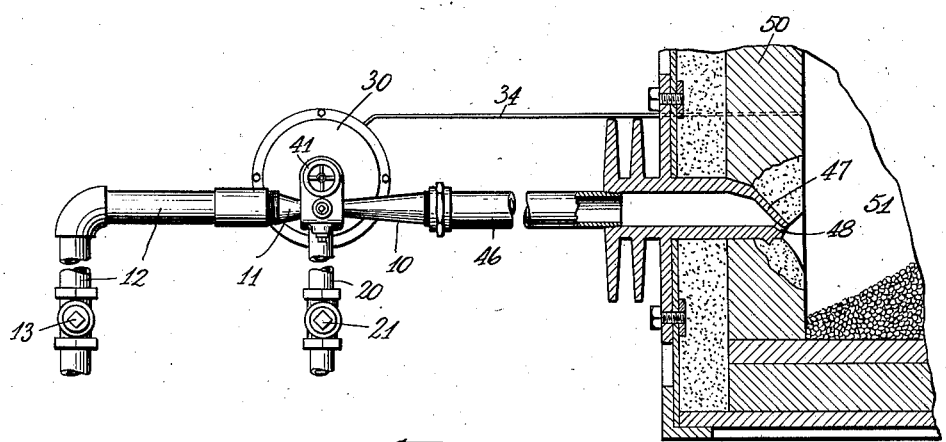
Fig. 1 is a side elevation of the apparatus shown as connected to a single burner or mixture discharge tube of a surface combustion furnace, the furnace wall and burner tube being shown in section.
Figure 1:
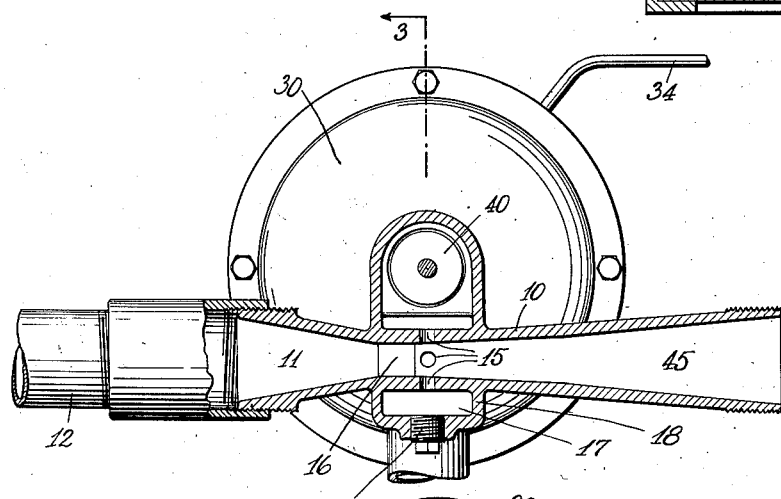

Referring to the drawings, and first to Figs. 1 to 4, 10 represents a Venturi tube of suitable form, to the entrance cone 11 of which air is supplied under pressure through a supply pipe or conduit 12 from any suitable source of supply, such as an ordinary fan blower, not shown. A valve 13 in the air supply pipe 12 serves to control the supply of air to the Venturi tube and thereby the amount of mixture produced. The Venturi tube is formed with a plurality of gas inlet openings 15 formed in the wall of the tube just beyond the throat 16 or part of the Venturi tube of minimum cross-section. The fuel gas is drawn into the Venturi tube through the inlet openings 15 from a chamber 17 surrounding the middle portion of the tube. The wall 18 of the chamber 17 may conveniently be made integral with the wall of the Venturi tube as shown, and the gas inlet openings 15, which may extend at right angles to the axis of the tube, are readily formed by drilling through openings in the wall 18 which are closed by screw plugs 19. The fuel gas is supplied to the chamber 17 from a suitable source of supply such as a service distribution line through a supply pipe 20 provided with a shut-off valve 21.

The fuel gas should be supplied at a pressure sufficiently low so that the flow of the gas into the Venturi tube shall be by reason of the suction or flow inducing action of the air stream flowing through the tube rather than because of gas pressure in the chamber 17, and this supply pressure should, most desirably be that of atmosphere or other pressure approximately equal to the internal furnace pressure, and the pressure should be maintained constant. In order to have a gas supplied at a suitable low pressure and to eliminate variations in line pressure, a pressure governor is provided for controlling the pressure under which the gas is supplied to the inspirator. The governor may be of any suitable construction. Most desirably, however, a governor such as shown in the drawings is employed which has the advantage that its operation is uninfluenced by the supply or line pressure of the gas.

The governor shown comprises a cylinder valve 25 mounted in a connecting passage or pipe 26 which leads to the gas chamber 17 and with which the supply pipe 20 is in communication through an orifice 27 which is controlled by the valve 25. The valve 25 is formed by a hollow cylinder having a running fit in the pipe 26 and is connected to and actuated by a controlling diaphragm 28 which is mounted within a casing 30 mounted on the end of the pipe 26. The diaphragm divides the space within the casing into two pressure chambers 31 and 32, the chamber 31 being in communication with the interior of the pipe 26 so that one side of the diaphragm is subjected to the pressure of the gas in the pipe 26. The chamber 32 may be in communication with the atmosphere through an opening 33 so that atmospheric pressure is maintained against the other side of the diaphragm, or the chamber may be connected, as by a tube 34 leading from the furnace chamber (Fig. 1), so as to maintain a pressure within the diaphragm chamber 32 and against the diaphragm equal to the furnace pressure. When the pressure in the pipe 26 and in the chamber 31 is greater than the pressure in the chamber 32, the diaphragm is forced to the right and the valve 25 is moved to the right, closing the orifice 27 and cutting off the flow of fuel gas from the supply pipe 20 into the pipe 26. When, on the other hand, the pressure in the pipe 26 and chamber 31 falls below the pressure in the chamber 32, the diaphragm is forced to the left and moves the valve 25 to the left to open the orifice 27 and admit gas to the pipe 26. The governor thus operates to maintain the pressure in the pipe 26 approximately equal to that in the chamber 32.

The fuel gas flows from the pipe 26 to the chamber 27 past an adjustable restriction formed in the construction shown by a disk valve 40 carried by a threaded stem extending through a threaded opening in the wall 18 and provided with a hand wheel 41 whereby it may be turned to move the valve 40 toward or away from its seat. The valve 40 thus provides an adjustable restriction, or flow controlling orifice, for causing a drop in pressure of the fuel gas flowing from the pipe 26 to the chamber 17, the amount of which drop in pressure will depend upon the adjustment of the valve. A reduction in the gas pressure within the chamber 17 causes a reduction in the amount of gas drawn through the orifices 15 to mix with the air passing through the Venturi tube. By adjustment of the valve 40, therefore, the proportions of the constituent gases in the mixture delivered from the Venturi tube may be varied as desired within limits.

Figure 2:
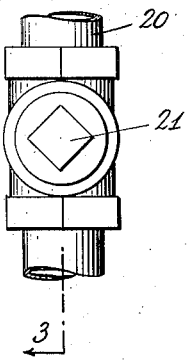
Fig. 2 is a side view of the mixing apparatus partly in section on line 2—2.

From the end of the pressure cone 45 of the Venturi tube a delivery pipe 46 leads to the burner nozzle or mixture discharge orifice or orifices. As shown in Fig. 2 of the drawings, the delivery pipe 46 leads to a single burner nozzle 47 having a restricted discharge orifice 48 and set in the wall 50 of a furnace structure so as to discharge into a furnace chamber 51. The connecting passage between the Venturi pressure cone and the burner orifice or orifices, that is, the passage through the burner nozzle or nozzles and connecting piping, should be of such relatively large size that there will be no or substantially no pipe resistance to affect the flow of the mixture.

In the operation of the apparatus, the air, supplied to the entrance cone of the Venturi tube under suitable relatively high pressure, has its pressure energy changed in large part to velocity energy in passing through the entrance cone so that the air passes through the throat of the Venturi tube and the first part of the pressure cone of the Venturi tube with its velocity greatly increased and its pressure correspondingly decreased, and the flow of the air stream at high velocity and low pressure past the gas inlet openings 15 causes a suction which results in the desired flow of the fuel gas from the chamber 17 into the Venturi tube to join and mix with the passing air. The amount of mixture supplied by the apparatus may be varied as desired within the working limits of the apparatus simply by adjusting the air control valve 13, the proportions of the mixture being maintained substantially constant under variations in air flow within the working range of the apparatus. As the air valve is adjusted to permit more or less air to flow, the gas flow increases and decreases in the same proportion, the final delivery pressure to the burner orifices rising and falling correspondingly. The proportion of gas entering the mixture is determined by the adjustment of the valve 40, and by such adjustment the apparatus may be adapted for gases having different heat values or different densities, and for change within the limits of the apparatus of the burner discharge orifice area.

It is found that no considerable inflow of fuel gas is obtained if the inlet orifices are located directly at the place of minimum cross-section of the Venturi tube. By locating these openings slightly beyond the place of minimum cross-section, however, the desired proportionate inflow of gas to an extent sufficient for producing a mixture of fuel gas and air having the desired proportionate amount of fuel gas to form an explosive mixture may be secured with fuel gases having wide differences in heat value, that is, requiring widely varying air gas ratios for forming the desired explosive mixture. The best results are obtained with the inlet orifices positioned very close to, or just beyond, the part of minimum cross-section of the tube, although an exact positioning of the orifices does not seem to be required.

With regard to the size of the gas inlet orifices, the practical rule to follow is to have them of sufficient size for the maximum proportionate flow of fuel gas desired. If too small, the amount of fuel gas entering will be too small. If larger than required for admitting the desired proportionate amount of fuel gas, the amount of fuel gas entering the tube may be limited and adjusted by adjustment of the adjustable restriction or flow controlling valve 40. For example, it has been found desirable in practice to provide a Venturi tube having a throat $1\frac{1}{8}$ of an inch in diameter with four inlet orifices arranged as shown in the drawings, each $\frac{5}{16}$ of an inch in diameter for use with air supplied at a pressure up to 4 or 5 pounds. Being made of excess size, the inlet openings need not be particularly formed for securing maximum flow for their size. The flow of the gas is controlled, not by the inlet orifices, but by the adjustable flow controlling restriction. The gas supply passage including the chamber 17 must be of sufficient size that the flow of the gas will not be affected by dead flow, or pipe resistance.

With regard to the ratio of burner orifice area to Venturi throat area, here again no very exact ratio need be observed. Of course, the burner discharge orifice area must not be so great as to prevent the building up of the necessary mixture pressure for causing the required excess velocity of discharge from the nozzle or as to unduly limit the range of quantity control; and on the other hand, the burner discharge orifice area must not be so small as to prevent sufficient pressure reduction at the Venturi throat and cause too great a resistance to flow in the throat for the desired proportionate velocity increase and pressure reduction in the throat. The apparatus permits, however, of a relatively wide latitude in the ratio of aggregate burner discharge orifice area to throat area without loss of efficiency and maintenance of proportionality through a desired range of mixture supply variation. An apparatus of given throat area may be used to supply a burner or burners of aggregate orifice discharge areas differing to a considerable degree, adjustment of the apparatus for supplying mixture of a desired air-gas ratio to a burner or burners of any particular aggregate discharge orifice area being made by means of the adjustable restriction controlling the flow of gas to the inlet openings.

In order to avoid change in mixture proportionality through back pressure resulting from heating of the mixture as it flows through the burner nozzles when in the operation of the furnace the burner nozzles tend to become highly heated, it is desirable to employ nozzles formed to prevent such heating of the mixture, that is, nozzles having an approximately constant pressure capacity characteristic under varying furnace temperatures, i. e. nozzles the capacity of or volume of flow through which under any given pressure is the same for different furnace temperatures to which the nozzle is exposed, or which have a constant flow coefficient regardless of furnace temperatures, and to avoid the use of nozzles having a varying pressure capacity characteristic, unless other means are provided for overcoming the effect of such nozzles on the maintenance of proportionality. The desired constant pressure capacity characteristic of the nozzles may be secured by forming the nozzles so that the temperature of the walls of their mixture passages will be prevented from becoming excessively high. Such nozzles are described and claimed in United States Letters Patent No. 1,242,114, dated October 2, 1917, and a nozzle of the kind described in that patent is illustrated in Fig. 1 of the drawings of this specification.

It is to be understood, of course, that apparatus of the present invention may be used with advantage under conditions when the automatic maintenance of exact proportions in the mixture is not required, and in such case the effect of heating of the mixture in the burner nozzle may be ignored.

Fig. 5 illustrates a modification of the mixing apparatus in which a portion of the Venturi tube is made removable so as to permit of changing the throat area of the tube to change the capacity of the apparatus by removal and replacement of a relatively small part of the apparatus. As shown in this figure, the entrance cone, throat, and first part of the pressure cone of the Venturi tube is formed by a separate and removable part 10ᵃ. The remaining portion, 10ᵇ, of the pressure cone of the Venturi tube is formed intergral with the gas chamber casing 18' and this casing is extended and formed at its end 60 with a central threaded end opening to receive a threaded shoulder formed on the removable Venturi tube member 10ᵃ and is externally threaded for connection to the internally threaded end of the air supply pipe 12. When the removable Venturi tube member 10ᵃ is screwed into place in the gas chamber as shown in Fig. 5, the inner end thereof meets and fits the end of the pressure cone section 10ᵇ. This tube member 10ᵃ is formed with gas inlet orifices 15 as in the form of apparatus shown in the other views through which the fuel gas enters from the gas chamber 17'. By disconnecting the air supply pipe from the end of the casing 18', the Venturi tube member 10ᵃ may be readily removed and another one inserted having a different sized throat or differing in other particulars.

It is to be understood that the invention is not to be limited to the exact construction and arrangement of parts shown and to which the foregoing description has been largely confined, but that it includes changes and modifications thereof within the claims.

What is claimed is:

1. The method of producing and supplying a mixture of gases in substantially constant proportions, which comprises supplying one of the gases under a relatively high pressure to serve as the inducing gas, changing some of the pressure energy of said gas to velocity energy with reduction of pressure and causing said gas flowing at low pressure and high velocity to pass from a passage of relatively small cross-section into a passage of gradually increasing cross-section wherein velocity energy of the gas is changed back into pressure energy, admitting the other gas supplied at a relatively low pressure to the edge of the stream of inducing gas at a point of relatively high velocity and low pressure slightly beyond the minimum cross-section of the passage through an inlet opening of excess size so that said other gas is drawn into the passage by induction, maintaining the pressure under which the induced gas is supplied substantially constant, varying the proportions of the inducing and induced gases in the mixture by adjusting a flow controlling orifice through which the induced gas supplied under such constant pressure flows to said inlet opening, and varying the quantity of mixture supplied by varying the supply of the inducing gas.

2. The method of producing and supplying a mixture of gases in substantially constant proportions, which comprises supplying one of the gases under a relatively high pressure to the entrance cone of a Venturi tube to serve as the inducing gas, admitting the other gas supplied at a relatively low and substantially constant pressure to the edge of the stream of the inducing gas within the Venturi tube at a point of relatively high velocity and low pressure slightly beyond the place of minimum cross-section of the tube through inlet openings of excess size in the wall of the tube, varying the proportions of the inducing and induced gases in the mixture by adjusting a flow controlling orifice in the passage through which the induced gas so supplied flows to said inlet openings, and varying the quantity of mixture supplied by varying the supply of the inducing gas.

3. Apparatus for producing and supplying a mixture of gases in substantially constant proportions, comprising means providing a flow-way having a part of minimum cross-section and a part of gradually increasing cross-section extending therefrom to serve as a pressure building cone, means for causing one of the gases supplied under a relatively high pressure to serve as the driving gas to flow at low pressure and high velocity through the part of minimum cross-section of said flow-way and into the part of increasing cross-section thereof, means providing a passage for supplying the other gas terminating in an inlet opening in the wall of the flow-way at a point slightly beyond the place of minimum cross-section thereof, said inlet opening being of a size greater than that required for admitting the desired proportionate amount of said other gas, pressure controlling means for maintaining the supply pressure of said other gas relatively low and substantially constant, a restriction between said pressure controlling means and said inlet opening for controlling the proportionate amount of gas entering the flow-way through said inlet opening, said restriction being adjustable for varying the proportions of the inducing and induced gases in the mixture, and means for varying the supply of the inducing gas to vary the quantity of mixture supplied.

4. Apparatus for producing and supplying a mixture of gases in substantially constant proportions, which comprises a Venturi tube having a plurality of inlet openings in the wall thereof arranged circumferentially and located slightly beyond the place of minimum cross-section of the tube, said inlet openings being of an aggregate size greater than that required for admitting the desired proportionate amount of gas, means for supplying one of the gases under a relatively high pressure to the entrance cone of the Venturi tube to serve as the driving gas, means for supplying the other gas under a relatively low and substantially constant pressure to be drawn through said inlet openings into the tube by the inducing action of the stream of driving gas, and an adjustable flow-controlling restriction past which said other gas so supplied flows to said inlet openings for controlling the proportionate amount of said other gas entering the tube through said openings.

5. Apparatus for producing and supplying a mixture of gases in substantially constant proportions, which comprises a Venturi tube having a plurality of inlet openings in the wall thereof arranged circumferentially and located slightly beyond the place of minimum cross-section of the tube, said inlet openings being of an aggregate size greater than that required for admitting the desired proportionate amount of gas, means for supplying one of the gases under a relatively high pressure to the entrance cone of the Venturi tube to serve as the driving gas, a passage through which the other gas is supplied to said inlet openings, automatic means for causing said other gas to be supplied to said passage at a relatively low pressure approximately equal to the pressure against which the mixture is discharged, and an adjustable restriction between said automatic means and said inlet openings for controlling the proportionate amount of said other gas entering the tube through said openings.

In testimony whereof I have hereunto set my hand.

ARTHUR W. PETERS.